(12) United States Patent
Astner

(10) Patent No.: US 10,046,921 B2
(45) Date of Patent: Aug. 14, 2018

(54) APPARATUS FOR GROUPING PIECE GOODS AND METHOD FOR FORMAT CHANGE

(71) Applicant: KRONES Aktiengesellschaft, Neutraubling (DE)

(72) Inventor: Michael Astner, Brannenburg (DE)

(73) Assignee: KRONES Aktiengesellschaft, Neutraubling (DE)

( * ) Notice: Subject to any disclaimer, the term of this patent is extended or adjusted under 35 U.S.C. 154(b) by 0 days.

(21) Appl. No.: 15/246,975

(22) Filed: Aug. 25, 2016

(65) Prior Publication Data

US 2017/0057754 A1 Mar. 2, 2017

Related U.S. Application Data

(63) Continuation-in-part of application No. 15/244,040, filed on Aug. 23, 2016, now abandoned.

(30) Foreign Application Priority Data

Aug. 31, 2015 (DE) .......................... 10 2015 114535
Sep. 1, 2015 (DE) .......................... 20 2015 104636
Dec. 4, 2015 (DE) .......................... 10 2015 121131

(51) Int. Cl.
*B65G 47/26* (2006.01)
*B65G 47/08* (2006.01)
*B65G 47/88* (2006.01)

(52) U.S. Cl.
CPC ....... *B65G 47/088* (2013.01); *B65G 47/8876* (2013.01)

(58) Field of Classification Search
CPC .................................................. B65G 47/088
(Continued)

(56) References Cited

U.S. PATENT DOCUMENTS

| 3,718,246 A | 2/1973 | Daidaine et al. |
| 4,878,337 A | 11/1989 | Raudat et al. |

(Continued)

FOREIGN PATENT DOCUMENTS

| DE | 1229899 | 12/1966 |
| DE | 3528993 | 2/1987 |

(Continued)

OTHER PUBLICATIONS

EP16182556—Extended European Search Report for Application dated Mar. 3, 2017.

*Primary Examiner* — Gene O Crawford
*Assistant Examiner* — Lester Rushin, III
(74) *Attorney, Agent, or Firm* — Simmons Perrine Moyer Bergman PLC

(57) ABSTRACT

The invention relates to a handling apparatus (1) for piece goods (2) that comprises at least one divider finger (14, 46, 51), which is introducible to a transport plane (5), largely perpendicular, from below, with the at least one divider finger being connected to a divider bar element (13, 13*, 43, 50). The divider bar element is movably arranged below the transport plane (5) and is guided in a specified movement path. The divider bar element is detachably connected to a profile element (11, 41). During a format change, the divider bar element is toolessly detached and interchanged for another divider bar element, which has divider fingers that are positioned differently and/or spaced apart differently from the divider fingers of the removed divider bar element.

19 Claims, 6 Drawing Sheets

(58) Field of Classification Search
USPC ............ 198/418.7, 419.1, 419.2, 419.3, 440, 198/867.15
See application file for complete search history.

(56) References Cited

U.S. PATENT DOCUMENTS

| | | | |
|---|---|---|---|
| 7,815,034 | B2 | 10/2010 | Fleck et al. |
| 8,458,991 | B2 | 6/2013 | Kaestner |
| 9,061,838 | B2 | 6/2015 | Reinischetal |
| 9,221,620 | B2* | 12/2015 | Ripkens ................. B65B 21/06 |
| 2007/0029162 | A1 | 2/2007 | Aulanko et al. |
| 2014/0024515 | A1* | 1/2014 | Wimmer ................. B65B 49/14 493/441 |

FOREIGN PATENT DOCUMENTS

| | | |
|---|---|---|
| DE | 3614559 | 11/1987 |
| DE | 3632691 | 4/1988 |
| DE | 4025706 | 2/1992 |
| EP | 2357145 | 10/2012 |
| EP | 2500296 | 2/2016 |
| FR | 2603260 | 3/1988 |
| GB | 2090804 | 7/1982 |

\* cited by examiner

APPARATUS FOR GROUPING PIECE GOODS AND METHOD FOR FORMAT CHANGE

CLAIM OF PRIORITY

The present application is a continuation-in-part of U.S. application Ser. No. 15/244,040, filed on Aug. 23, 2016, which in turn claims the benefits of German Application 10 2015 121 131.9, filed on Dec. 4, 2015, and German Application 20 2015 104 636.7, filed on Sep. 1, 2015, and German Application 10 2015 114 535.9, filed on Aug. 31, 2015, all of which are incorporated by reference.

FIELD OF THE INVENTION

The present invention relates to an apparatus for grouping piece goods. The invention also relates to a method for format change within an apparatus for grouping piece goods. Furthermore, the invention relates to a transport section for conveying piece goods within a packaging facility.

BACKGROUND OF THE INVENTION

Apparatuses for handling piece goods are often used in production system for the mass production of articles or piece goods, in which production system the articles or piece good are transported between different treatment devices or handling apparatuses in a more or less closed product flow. This product flow has to be divided in different, spaced-apart sub-groups depending on the capacity and structure of the treatment devices or handling apparatuses located further downstream. For example, in the beverage industry it is often required that upstream of a packaging machine beverage containers incoming in a mass flow, such as bottles or cans, are grouped into packs of a convenient size suitable for sale. In this case, the apparatus is referred to as a grouping device.

Alternatively, such a handling apparatus also serve to separate piece goods incoming in a mass flow for further processing, especially by spacing them apart from each other.

If in the present context the wording grouping or separation of articles, piece goods, beverage containers or the like is used, it usually means the production of gaps in a continuous product flow or mass flow. The product flow continues after the grouping, but now the individual articles or piece goods are combined into groups of two, four, six or even more articles or piece goods, the articles or piece goods within the group being close to one another or being in close proximity to one another. The thereby formed individual groups are separated from each other by a defined distance or gap. After the separation of articles or piece goods out of the product stream, the product stream continues. But now the articles or piece goods are separated from each other; in particular the articles or piece goods are spaced apart from one another at a defined distance.

The number of articles or piece goods per group or the separation of the articles or piece goods depends on the packaging requirements of the packaging machine located downstream in the production process. The thus grouped article compilations can be combined, for example, by means of an outer packaging. For example, such an article group can be enveloped by a shrink film, which is then shrunk by heat onto the article group, thereby producing a so-called pack, foil pack or shrink pack. Alternatively the grouped articles can be combined using a cardboard packaging. To envelop the article compilation with a respective cardboard packaging, for example, the article group is pushed onto a respective foldable carton blank. The carton blank comprises side parts protruding laterally or on all sides over the base of the article group. The protruding parts of the carton blank are then folded upwards around the article group. Another possibility of providing the grouped articles with an outer packaging comprises the positioning of the articles on a so-called tray and enveloping the group of articles on the tray with shrinking film. Moreover the articles can be combined as so called strap packs, wherein a horizontal strapping or two or more horizontal strappings are wrapped around the group of articles, the strapping(s) being under tension to tighten the articles together.

For example, the separated articles can be fed into devices that produce mixed packs, whereby different articles or the like are combined as a group.

Different grouping methods for managing such product flows are known from the prior art. For example, the DE 31 44 449 A1 discloses a grouping device with divider fingers mounted on traverses, the divider fingers protruding from below into a closed product flow, in order to produce gaps between the articles or products. The gaps in the product flow and thereby the grouping of the articles or products is achieved because of the difference in speed between the conveyor track and the traverse. The traverses run in a closed orbit that is located in a plane perpendicular to the transport plane. However, in such grouping devices no quick adjustments to different sizes of product groups, that are to be grouped by the grouping device, are possible. Should an adjustment be required or should the whole machine be adapted to other article sizes or products sizes, a stopping of the machine is essential in order to make the necessary mechanical adjustments and settings.

Basically, it is advantageous to use divider elements well known from prior art, the divider elements being appropriately spaced apart from one another, for the division of groups of articles or piece goods from the incoming mass flow or for the separation of articles or piece goods from the incoming mass flow. Especially so-called divider fingers can be used as divider elements. The divider elements are usually pre-mounted at respective pre-defined distances on divider bars. When changing the product, the divider bars have to be adjusted to the new product according to its requirements. This usually requires the use of tools and leads to downtime in production due to the amount of time required for the changeover. An adjustment is necessary, for example, when the production process is to be switched to other articles of a different size. An adjustment is also required when a different number of articles is to be combined into a new packaging format. As a result, the requirements change due to the desired mew group formation or due to the respective desired distances between the product groups or due to the respective desired distances between the articles or piece goods. Also a change to a different outer packaging can require an appropriate adjustment of the handling apparatus.

Document DE 21 10 198 A1 discloses a grouping device for a facility for packing and unpacking of goods; the grouping device comprising interchangeable restraining members; the restraining members consisting of limit stops that are rigidly connected to a common plate. The guiding device comprises a set of restraining members which are interchangeable and can be adapted to the diameter of the bottles. The restraining members are supported on the bottom part by two pins each or the like. Furthermore the restraining members are fixed to the bottom part by means of a locking element, which consists of a retractable finger, the retractable finger being displaceable within a pin. Hereby, the position and/or number of the restraining members mounted to the guiding device can be changed, but this change is very time consuming and labor intensive.

EP 2357145 B1 also discloses a divider bar with adjustable fingers, whereby the divider bar can be used for several different formats. In this case, spacer elements are disposed between the fingers; the spacer elements enabling the desired adjustability of the divider bar. However, the adjustment is still very time-consuming and requires the use of tools.

DE 10 2011 014 495 A1 describes an apparatus for grouping piece goods. The apparatus may comprise an optional parking sector which can be used, for example, for adjusting the divider means to different settings of the transport path. Furthermore, it is possible to use this parking sector for an intermediate storage of unused divider means.

In all known divider devices and/or grouping devices it is alternatively possible to remove the divider bars completely and replace them with new divider bars, whereby the new divider bars are adapted to the new format. However, for such exchanges to take place, the whole system must be stopped, in order to interchange complete divider bars with new divider bars having divider fingers spaced in appropriate intervals. The exchange always requires the use of suitable tools.

According to the current state of the art, the complete divider bar is removed in such a format change and is then replaced with a new format-dependent divider bar. An operator has to bring the divider bar into a neutral position by using a crank or the like auxiliary means and has to release at least two screw connections. This is usually done on a service side that is accessible to the operator so that he can remove the entire divider bar. Since the operator side of the machine and the service side of the machine are normally arranged on opposite sides of the grouping device, the operator must walk around the machine in order to release the second screw. To mount the new divider bar, the operator has to proceed accordingly. For a complete product change this must be done several times according to the number of divider bars required within the device. Since the grouping device is usually part of a much larger overall facility, under certain circumstances it may be necessary that the operator has to walk around the entire facility several times during the change of the divider bars. This increases the production downtimes significantly.

Furthermore a plurality of fully pre-assembled and fitted divider bars must be provided and especially be held in store for different products, articles or piece goods.

DE 10 2004 042 474 A1 discloses a typical grouping process, wherein a plurality of rows of piece goods are divided into several groups of piece goods, whereby gaps are formed in between the groups of piece goods. The dividing and gap formation is achieved by means of dividing fingers inserted from below into the respective stream of piece goods.

SUMMARY OF THE INVENTION

Therefore a primary objective of the invention is to provide a system for customizing and adjusting divider bars of apparatuses for handling piece goods during a product change, whereby in particular the amount of work and the work time is reduced, so that the respective change of the divider bar(s) during a product change can be done quickly and easily.

This object of the invention is achieved by an apparatus for grouping articles and/or piece goods and a method for format changes with the features of the independent claims. Further advantageous embodiments are described by the respective dependent claims. This object of the invention is furthermore achieved by a transport section for conveying piece goods within a packaging facility.

To achieve the above objective, the invention proposes an apparatus for grouping piece goods, wherein the piece goods are being fed on a transport section along a transport plane in a substantially continuous stream and wherein the piece goods are grouped along the transport direction by at least one divider finger being introduced into the stream of piece goods transversely to the transport plane from below. The at least one divider finger is connected to a divider bar extending transversely to and below the transport direction or the at least one divider finger is mounted to or fixed to a respective divider bar. The divider bar is especially formed as a divider bar module comprising a profile element or profile section and a divider bar element. The profile element or profile section is preferentially permanently fixed within the apparatus. The divider bar element comprising the divider fingers can be easily exchanged. The divider bar element is anchored at least on one side, preferentially on both sides of the transport plane at a conveying device(s) and which divider bar element is form-lockingly and/or force-lockingly fixed there to the at least one continuous profile section or to profile sections holding at least the final sections of the divider bar element. The fixing of the divider bar element to the at least one profile section is detachable without the use of tools and reproducibly mountable in the specified installation position. In this apparatus according to the invention it is provided that the at least one profile section is guided movably in a specified movement path below the transport plane together with the divider bar element, which is at least in sections fixable to the profile section in a form-locking and/or force-locking contact.

The apparatus for grouping articles and/or piece goods according to the invention can either be an apparatus in which piece goods incoming in a mass flow or mass stream are divided into groups, whereby the groups are being spaced apart from one another by a defined distance. Furthermore, such an apparatus can be used to separate piece goods incoming in a mass flow and to arrange the separated piece goods in a defined distance to each other. In particular such a handling apparatus is arranged in the infeed section of a packaging facility; the packaging facility summarizing and/or combining the respective grouped piece goods with an outer package to a pack. For example, shrink film, carton wrappings, trays, trays in combination with shrink film or the like can be used as outer packaging. The phrase tray is used for a support comprising lateral boundaries. Such a handling apparatus can also be arranged in the infeed section of a packaging machine that produces, for example, mixed packs. To produce mixed packs different piece goods, each different piece good incoming in a mass stream, have to be separated and then assembled by another grouping device to form a mixed pack.

The apparatus for handling piece goods according to the invention may in particular be an integral part of a packaging facility.

In the following description the apparatus for handling articles and/or piece goods will also be referred to as handling apparatus. The handling apparatus comprises a transport device forming a transport plane on which the piece goods are moved in a transport direction. The handling apparatus furthermore comprises at least one divider finger that can be introduced into the stream of piece goods from below perpendicular to the transport plane. The divider finger is attached to a divider bar element. Preferentially the handling apparatus comprises a plurality of divider fingers, each mounted on a separate divider bar element. According to another embodiment of the invention, the handling apparatus comprises at least one divider bar element with a plurality of divider fingers mounted to the divider bar element. Each divider bar element is movably disposed below the transport plane and is guided in a specified path of movement. In particular it can be provided that the divider bar module comprising the divider bar element is guided with different velocities in different section of the movement path. The movement of the divider bar module within the path of movement can therefore be variable over time. The route of the movement path is usually spatially fixed, but there are also embodiments conceivable in which the movement path is spatially variable and can thus be matched particularly well to the new product in a product change.

The piece goods are fed along the transport plane by the transport device in a substantially continuous succession and are grouped or separated along the transport direction of the transport device by at least one divider finger; the divider finger being inserted into the stream of piece goods from below substantially perpendicular to the transport plane.

Preferably, a longitudinal axis of the divider bar element within the handling apparatus is arranged perpendicular to a transport direction of the transport device and comprises a plurality of divider fingers that are spaced apart from one another by a defined distance. In particular, the divider bar or divider bar module is arranged on at least one circumferential conveying device, which predefines the movement path of the divider bar or divider bar module. The conveying device is partially situated below the transport device for the piece goods. The at least one divider finger is inserted through the conveying device straight from below and brought into engagement with a substantially closed stream of piece goods. The divider bar or divider bar module is carried along by the conveying device in parallel to the transport device for the piece goods, wherein the speed of the conveying device is at least in sections slowed down relative to speed of the transport device. Thus, the piece goods trailing the divider fingers are slowed down by the divider fingers. After a defined distance the divider fingers are removed from contact with the piece goods by plunging down below the transport plane. This results in the piece goods now moving along with the transport speed of the transport device. This leads to a desired gap formation between groups of piece goods; each group comprising a defined number of piece goods. Respectively this leads to a desired gap formation between the separated piece goods. By varying the number of divider bars or divider bar modules being used and by varying the speed difference between the transport device for the piece goods and the conveying device for the at least one divider bar or divider bar module, the number of piece goods separated as a respective group or the separation of the piece goods and the size of the gap between the groups of piece goods or the size of the gap between separated piece goods can be adjusted accordingly. In particular, the groups of piece goods or the separated piece goods can therefore be formed or arranged in accordance with the requirements of a downstream packaging machine.

As already described above, divider bar is made of at least two parts and comprises a circumferentially guided profile element or a profile section and a removable or replaceable divider bar element, whereby at least one divider finger is arranged on the replaceable divider bar element. The profile element or profile section and the replaceable divider bar element can be coupled to one another at least largely form-lockingly and they are preferably unilaterally separable from one another. The profile element or the profile section can alternatively be referred to as a receiving element, since it serves to accommodate or receive the replaceable divider bar element within the handling apparatus.

According to one embodiment of the invention the at least one divider bar element can be released out of the form-locking and/or force-locking contact with the profile section and can be separated from the profile section under cancellation of the form lock and/or force lock by way of moving the divider bar element relative to the profile section.

The handling apparatus may optionally have a service opening on one side, especially on one side parallel to the transport direction of the piece goods on the transport device. The replaceable divider bar element of the divider bar or divider bar module can be unilaterally released from the profile element in the area of service opening and can be easily removed through the service opening from the handling apparatus. In particular, a locking of the replaceable element to the profile element is provided only on one side of the device.

In particular, the replaceable element is removed or pulled out from the profile element or the profile section through the service opening. Subsequently another replaceable element is inserted or introduced into the profile element through the service opening; the new replaceable element showing an arrangement of divider fingers adapted for the new product. After the replaceable element is fixed to the profile element in the area of the service opening via at least one fastening means, the new production can be started.

As a rule, a handling apparatus comprises a plurality of divider bars or divider bar modules, the divider bars being arranged on a defined path of movement for the at least one divider bar and being spaced apart from one another on this defined path of movement. The divider bars are each placed successively in the changing position and the replaceable divider bar element of the divider bar arranged within the changing position is replaced respectively. Therefore it is sensible to execute the exchange or replacement sequentially, wherein all operations are executed in the area of the service opening or through the service opening.

According to one embodiment of the invention the replacement of the replaceable element during a format change can be automated. For example, the replacements may be executed by an appropriate robot. The same robot can also perform other functions in a format change of the packaging facility or during ongoing operation of the packaging facility, for example, exchanging the packaging materials like film rolls or cardboard magazines.

Furthermore, the handling apparatus may comprise a magazine with replaceable divider bar elements or a magazine with replaceable divider bar elements may be assigned to the handling apparatus. The magazine is preferably located in direct vicinity to a service opening or to an access area corresponding to the changing position at which the replacement of the replaceable divider bar elements is performed. In the case of a format change the removal of replaceable divider bar elements from the magazine and the replacement of the divider bar elements on the profile elements of the handling apparatus can be automated.

In particular, various interchangeable divider bar elements may be arranged within the magazine at defined positions. For a format change the corresponding parameters are input into the control unit. The control unit then calculates which divider bar element is needed and controls the removal of the respective replaceable divider bar element from the magazine and the replacement at the profile element. This can be automated, for example, by using a robot, a revolver magazine, a paternoster magazine or the like.

The invention further relates to a movable divider bar element with at least one divider finger attached to the divider bar element, wherein the divider bar or divider bar module is an integral part of an apparatus for grouping piece goods as described above. The movable and interchangeable divider bar element may, in particular, comprise one or more features and/or characteristics of the handling apparatus described above.

The invention further relates to a packaging facility that includes at least one handling apparatus for dividing and/or grouping articles or piece goods into desired groups or for separating and spacing articles or piece goods. The packaging facility furthermore includes at least one device for further processing of the grouped or separated articles or piece goods, example giving, a device for at least partially combining the grouped piece goods in the form of a pack. For example, this device can be a film wrapping module comprising a shrink tunnel, wherein the grouped articles or piece goods are enclosed by a shrink film that is tightly shrunk onto the articles or piece goods within the shrink tunnel, thereby creating a pack in which the articles or piece goods are firmly packed together. Alternatively, the device may be a cardboard cover module. The article group or piece goods group is placed on a cardboard blank, which is subsequently folded around the articles or piece goods. Furthermore, it could be a grouping device that combines different separated articles into so-called mixed packs, whereby the mixed packs are subsequently fed to a further packaging machine, etc. The expert in the technical field knows further packaging machines, which may also be part of such a packaging facility. The handling apparatus of the packaging facility can show one or more features and/or characteristics of the handling apparatus described previously.

To achieve the above object, the invention also proposes a method for format change within an apparatus for grouping of piece goods, in particular within an apparatus according to one of the embodiments described above. This device is equipped with at least one divider bar element with divider fingers for contacting the piece goods. The piece goods are fed in an essentially closed stream on a transport section along a transport plane and are grouped along the conveying direction by at least one divider finger; the divider finger being inserted into the stream of piece goods from below and transverse to the transport plane. The at least one divider finger is connected and fixed to a divider bar element, which extends transversely to and below the transport direction. The divider bar element is anchored to conveying device on both sides of the transport plane and is form-lockingly and/or force-lockingly fixed there to at least one continuous profile section or to profile sections holding at least the end sections of the divider bar element. To carry out a format change, the fixation of the divider bar element to the at least one profile section is detached without the use of tools. The divider bar element is then replaced by another divider bar element. The new divider bar element comprises divider fingers that are differently positioned and/or differently spaced compared to the divider fingers on the extracted divider bar element. The insertion of the new divider bar element into the profile section uses the defined installation position. According to this method the divider bar element is released from the form-locking and/or force-locking contact to the profile section and separated from the form-locking and/or force-locking contact with the profile section under cancellation of the form lock and/or force lock by way of moving the divider bar element relative to the profile section.

According to the method not the whole divider module is released from the handling apparatus and replaced. Instead, only the replaceable divider bar element is exchanged in a changing mode. Hereby, the divider bar element is unilaterally released from the profile element or profile section within the handling apparatus in an access area or at a service opening. Subsequently the replaceable element is removed through the service opening of the handling apparatus. Thereupon, a new replaceable element is inserted into the profile element through the service opening and the replaceable element is fixed in a correct position to the profile element.

According to the method, it is preferably provided that the divider bar element is released and separated from the form-locking and/or force-locking contact with the at least one profile section by shifting along its longitudinal extension direction. A magnetic adhesive contact can be released and the divider bar element can be separated from the profile section, for example, by twisting and/or lifting off the divider bar element from the profile section. In an operating position the divider bar element may optionally be magnetically and/or mechanically interlocked with the at least one profile section for the purpose of fixing a specified installation position. In addition, it is provided that in order to perform a format change the divider bar element can be removed from the apparatus unilaterally and/or that the divider bar element can be unilaterally replaced with another divider bar element via at least one access area or service opening. Hereby, a control unit of the apparatus controls the movements of the profile section and defines the positioning of the profile section along its path of movement, wherein the divider bar or divider bar module is moved to the changing position adjacent to the access area or service opening, whereby the divider bar and especially the movement of the divider bar is controlled in particular by the control unit.

Accordingly, the replacement of the replaceable element can comprise the following steps: First, the divider bar or divider bar module is arranged within the handling apparatus in a defined changing position in the region of a service opening. Then the unilateral fixing of one or more attachment means between the replaceable divider bar element and the profile element is/are released, the one or more attachment means being located at the end of the divider bar or divider bar module facing the service opening. Subsequently, the removable divider bar element is removed from the handling apparatus via the service opening from the side of the unilateral attachment. In particular, the replaceable divider bar element gets pulled out of the profile element through the service opening of the handling apparatus.

For replacement, a new divider bar element is introduced into the profile element through the service opening; in particular a new divider bar element is inserted into the profile element through the service opening. The new divider bar element is unilaterally fixed with at least one attachment means to the one end of the profile element facing the service opening; in particular in order to prevent a lateral, relative displacement between the replaceable divider bar element and the profile element, which would affect the positioning of the divider fingers.

It is preferentially provided that the movement of the dividing bar into the changing position during the changing mode of the handling apparatus is controlled. The method may alternatively or additionally include one or more features and/or characteristics of the handling apparatus described above. The method may provide that the exchange of the replaceable divider bar element on the profile element via the access portion of the handling apparatus or via the service opening is automated for a format change. In this case a magazine comprising a plurality of different divider bar elements may be assigned to the handling apparatus, wherein during a format change, the removal of the respective divider bar element from the profile section within the handling apparatus, the retrieval of a new divider bar element from the magazine and the exchange of the divider bar elements on the profile section within the handling apparatus are automated. Moreover the method may provide; that the replacement of the divider bar elements is done automatically at the respective changing position via the access area or via the service opening, in particular by means of a handling apparatus or robot.

The advantages of the apparatus for grouping of piece goods and the method are, in particular, that the changeover times required for a product change are reduced significantly. This is possible, particularly, because the operator does not have to release the divider bar from two sides, in particular from a service side and an opposite operating side, in order to remove the divider bar from the handling apparatus and to replace the divider bar with a new divider bar. The exchange is achieved by inserting only a part of the divider bar or divider bar module in the form of a replaceable element into a profile element from just one side of the handling apparatus. The profile element is permanently installed within the handling apparatus and arranged on a circumferential path of the divider bar or divider bar module. Thus, the operator must not run around the device or facility in order to release a second attachment.

During an exchange of divider bars as known from prior art, the divider bars are positioned within a suitable changing position by the operator by cranking or the like, which may cause damage to the handling apparatus. Due to the now exactly defined changing position, to which the divider bar can now be simply driven, such damage to the handling apparatus can be excluded.

The profile elements are permanently installed within the handling apparatus and stabilize the divider bar elements during ongoing production. In particular, the replaceable elements and the at least one divider finger are protected by the profile elements against torsion or warpage; this is because a movement of the replaceable element and the at least one divider finger always take place in conjunction with a movement of the profile element.

Since not a complete divider bar must be replaced during a product change, but only a part, in particular the replaceable divider bar element comprising the at least one divider finger, less format parts have to be kept available for a format change, thus leading to material savings and cost savings for the exchange.

A further advantage of the handling apparatus and of the method according to the invention is that the format change can be automated, which leads to further cost reduction.

Finally, the present invention includes a transport section for transporting piece goods within a packaging facility and/or handling apparatus for piece goods. The transport section comprises at least one transport device with a transport plane for moving piece goods in a direction of transport and at least one divider element within the transport section that can be inserted into the transport plane from below. The at least one divider element, the divider element acting on at least one piece good and thereby increasing or decreasing the speed of the piece good in relation to the transport device, is a divider finger. The divider finger is attached to a divider bar element. The divider bar or divider bar module with the divider bar element is guided movably in a specified movement path below the transport plane, the divider bar element moving together with a profile element that fixes the divider bar element at least in sections in a form-locking and/or force-locking contact. The divider bar element can be separated from the profile element under cancellation of the form lock and/or force lock by way of moving the divider bar element relative to the profile section, especially the form lock and/or force lock between the divider bar element and the profile element can be cancelled by shifting the divider bar element along its longitudinal extension direction, thereby separating the divider bar element from the profile element. Further aspects and variations of the transport section according to the invention are already defined above; especially related in connection with the inventive handling apparatus. Aspects and variants mentioned in connection with the inventive method are equally transferable to the transport section for transporting piece goods within a packaging facility.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

Figure 1A:
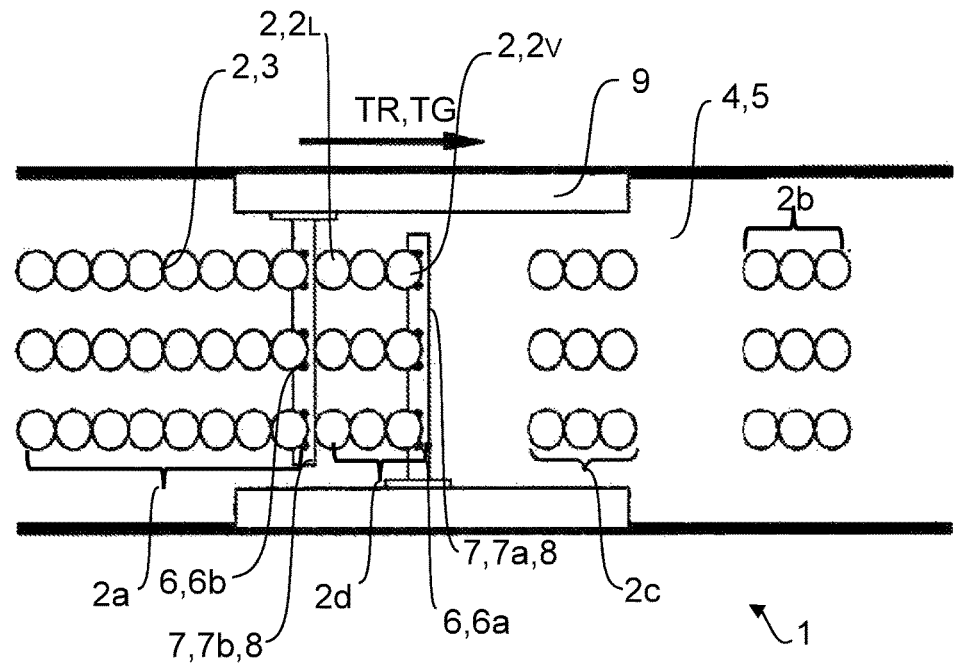
FIG. 1A shows a schematic view from above of a handling apparatus with divider fingers for dividing or separating or grouping piece goods.

The same or equivalent elements of the invention are each designated by the same reference characters in the FIGS. 1A to 7. Furthermore and for the sake of clarity, only the reference characters relevant for describing the respective figure are provided. It should be understood that the detailed description and specific examples of the handling apparatus as well as of the method according to the invention, while indicating preferred embodiments, are intended for purposes of illustration only and are not intended to limit the scope of the invention.

DETAILED DESCRIPTION OF THE INVENTION

Figure 1B:
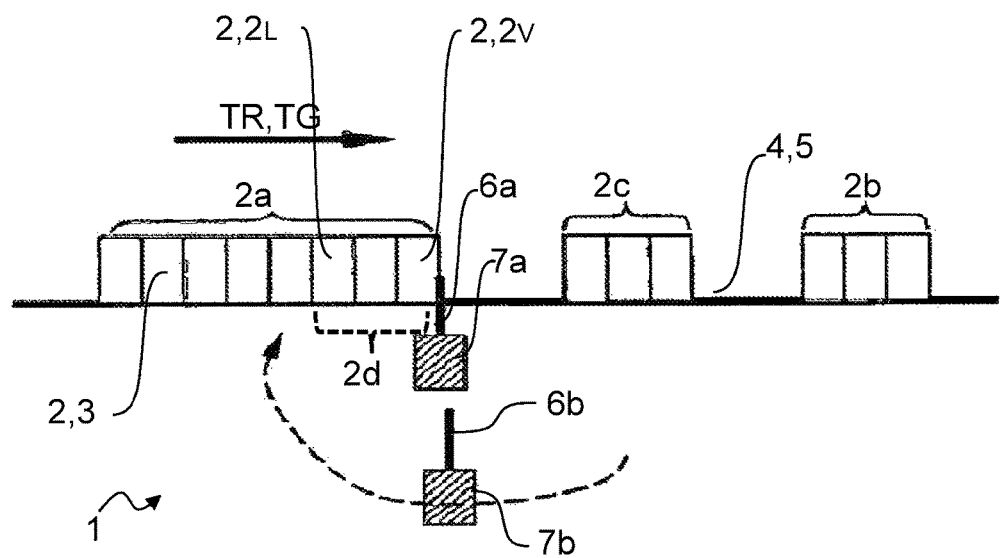
FIG. 1B shows a side view of the handling apparatus of FIG. 1A.

The schematic view from above of FIG. 1A shows a handling apparatus 1 for the grouping of piece goods 2, the piece goods being transported in parallel piece good streams 2a in a transport direction TR. FIG. 1B shows a side view of the handling apparatus 1.

As can be seen in FIGS. 1A and 1B the piece goods 2 in the piece good stream 2a are already grouped in rows. The piece goods 2 can, for example, be designed as beverage containers 3, bottles or cans. The piece goods 2 are transported on the transport device 4 in transport direction TR, thereby standing upright on the transport device 4. In each case several rows of piece goods 2 are transported in transport direction TR, the transport being supported by friction grip. The support plane for the piece goods 2 is formed by the transport device 4 that also forms the transport plane 5. The handling apparatus 1 comprises divider fingers 6 arranged on divider bars 7 for grouping the piece goods 2. The divider fingers 6 are brought into contact with the piece goods 2 by being inserted into the piece good stream 2a from below through the transport plane 5. The transport device 4 may, for example, be formed by a plurality of parallel conveyor belts with lateral intermediate intervals between the conveyor belts, whereby a free penetration of the divider fingers 6 through these lateral intermediate intervals is possible. In the embodiment shown in FIG. 1, the handling apparatus 1 comprises two independent groups of divider fingers 6a and 6b, which are arranged on two non-mechanically interconnected divider bars 7a and 7b. The divider bars 7a, 7b are, for example, formed as cantilever arms 8 extending parallel to the transport plane 5, each cantilever arms 8 being attached to its own vertical cross table or X-Y table 9 or an equal drive unit laterally outside and below the transport device 4.

As can be seen from the perspective views of FIGS. 2A to 5 and will be explained in more detail with reference to the schematic representations of FIGS. 6 and 7, the divider bars 7a and 7b according to the present invention are each replaceable, preferably without the aid of special tools. For this purpose the divider bars 7a and 7b are made of several parts each (see for example FIG. 6).

A grouping process to be carried out by means of the handling apparatus 1 is illustrated with reference to the schematic side view of FIG. 1B. The divider fingers 6a of the divider bar 7a are brought into engagement with a substantially closed stream of piece goods 2a by introducing the divider fingers 6a into the stream of piece goods 2a straight from below. The divider fingers 6b of the leading divider bar 7b; the divider bar 7b running ahead about the length of one group of piece goods; were previously engaged with the already grouped piece goods 2c (group of piece goods 2c). In this phase the divider fingers 6a and the divider bar 7a move slower than the transport device 4, therefore the foremost located piece good 2 of the stream of piece goods 2a is pushed against the leading divider fingers 6a. Given the difference in speeds of the transport device 4 and the divider bar 7a the already separated groups of piece goods 2c and 2b move faster than the stream of piece goods 2a, which is still slowed down by the divider fingers 6a. As shown, this results in the generation of gaps between the individual groups of piece goods 2b, 2c and 2a or 2d.

FIG. 1A particularly shows a situation in which the groups of piece goods 2b and 2c are already separated completely from the stream of piece goods 2a, while the group of piece goods 2d is currently in a phase of separation from the stream of piece goods 2a. In particular, the preceding piece good 2V of the group of piece goods 2d is still restrained by the divider fingers 6a of the divider bar 7a. Meanwhile the stream of piece goods 2a following the last piece good 2L of the group of piece goods 2d to be separated from the stream of piece goods 2a is restrained by the divider finger 6b of the divider bar 7b. At this particular moment it may be provided that the speed of the leading divider bar 7a is greater than the speed of the trailing divider bar 7b. Furthermore, it is useful, if the speed of the leading divider bar 7a is lower than the transport speed TG of the transport device 4 and thus lower than the transport speed TG of the groups of piece goods 2b and 2c already separated from the stream of piece goods 2a.

The distances between the separated groups of piece goods 2b and 2c are set corresponding to the necessary pitch of a downstream packaging machine, for example, a packaging machine that envelopes the groups of piece goods with film or cardboard blanks.

Meanwhile the stream of piece goods 2a is restrained by the divider fingers 6a of the divider bar 7a, the divider fingers 6b of divider bar 7b are inserted into the stream of piece goods 2a from below in such a way that a group of piece goods 2d can be separated from the stream of piece goods 2a. Hereby the speed of the leading divider bar 7a may, for example, be increased with respect to the speed of the divider bar 7b. Optionally the speed of the leading divider bar 7a may be increased up to the transport speed TG of the transport device 4. After reaching the desired distance from the stream of piece goods 2a and from the group of piece goods 2c, the separation of the group of piece goods 2d is fully achieved. Then the divider bar 7a is retracted out of the transport plane 5 by a downward movement, the downward movement may take place during a briefly accelerated forward movement of the divider bar 7a as shown for the divider bar 7b in FIG. 1B.

The divider fingers 6a on the divider bar 7a are then re-inserted into the stream of piece goods 2a from below, whereby due to the different speeds of the transport device 4 and the divider bar 7a a new group of piece goods gets separated from the leading end of the substantially closed stream of piece goods 2a. To perform the respective groupings of the stream of piece goods 2a, the divider bar 7b with the divider fingers 6b moves back to an initial position. Thereby, the divider bar 7b moves in a direction opposite to the transport direction TR of the piece goods 2 and below the divider bar 7a. At the initial position the divider fingers 6b reverse their direction of movement, now again running parallel to the transport direction TR. The divider fingers 6b can now be re-inserted into the stream of piece goods 2a through the transport plane 5 from below.

From the description above it is immediately clear that different sizes and diameters of piece goods 2 within the stream of piece goods 2a require respectively different distances between the divider fingers 6, 6a, 6b on the respective divider bars 7, 7a, 7b. In order to work with these different distances in the grouping process, it is inevitable that the divider fingers 6, 6a, 6b on divider bars 7, 7a, 7b remaining in the handling apparatus 1 have to be released from the divider bars 7, 7a, 7b and remounted on the divider bars 7, 7a, 7b at respective changed positions. This represents a significant disadvantage of the hitherto known prior art, because this adjustment is highly labor intensive and time intensive. The invention provides a viable and very advantageous possibility to remove complete divider bars 7, 7a, 7b from the handling apparatus 1 and replace them with other divider bars 7, 7a, 7b with suitably spaced divider fingers 6, 6a, 6b. Because of the modular configuration of the divider bars 7, 7a and 7b this can be done in a particularly simple and time-saving manner, as will be explained more fully hereinafter.

Figure 2A:
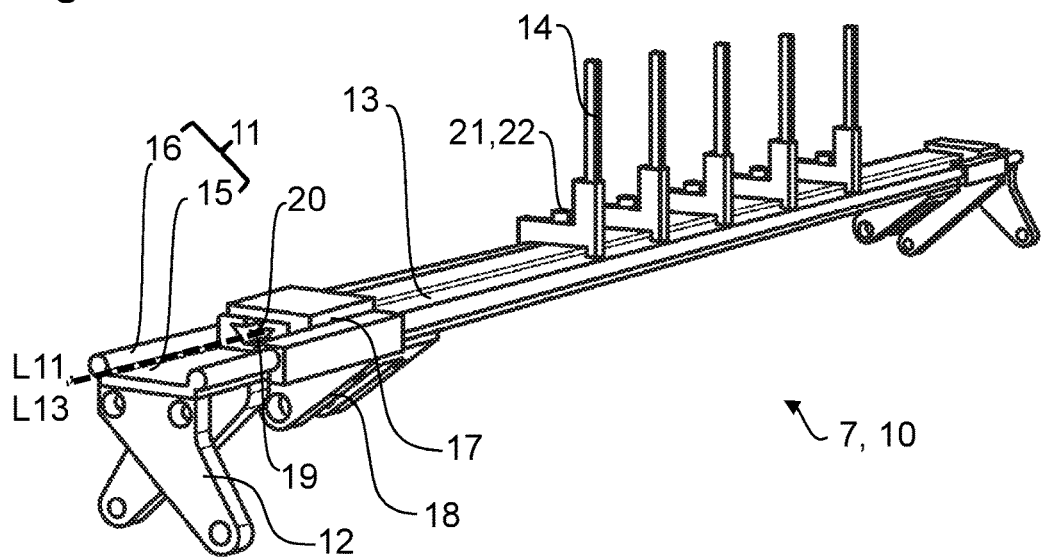
FIG. 2A shows a first embodiment of a divider bar module according to the invention in a perspective view.
Figure 2B:
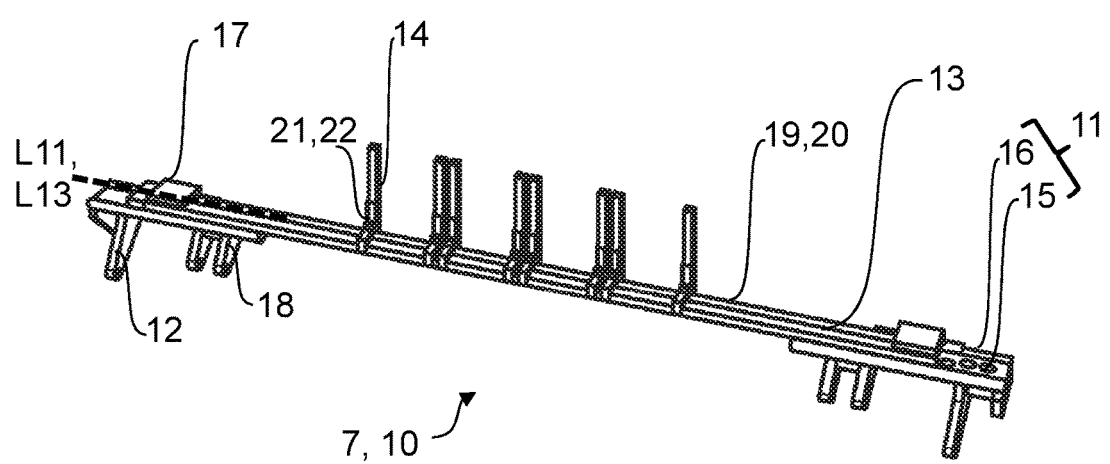
FIG. 2B shows a further perspective view of the divider bar module according to FIG. 2A.
Figure 3A:
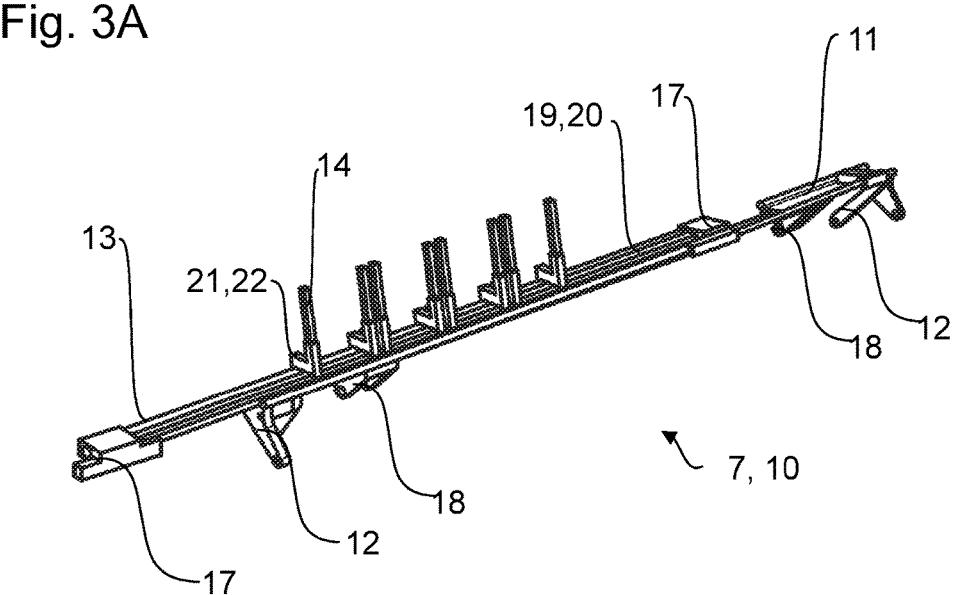
FIG. 3A shows the partially pulled out divider bar of an inventive divider bar module according to FIGS. 2A and 2B.
Figure 3B:
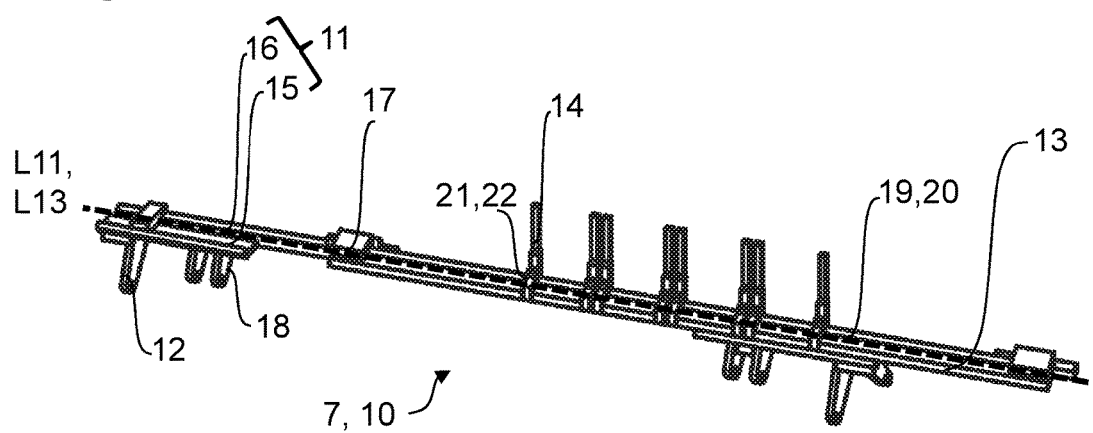
FIG. 3B shows another perspective view of the partially pulled out divider bar according to FIG. 3A.

The schematic perspective views of FIGS. 2A and 2B show different views of a first embodiment of a divider bar module 10 according to the invention forming the divider bar 7 according to FIGS. 1A and 1B. The divider bar module 10 consists of a profile element 11 or profile section 11 and a replaceable divider bar element 13 which can be form-lockingly and/or force-lockingly connected to the profile section 11 and which can be held by or within the profile section 11. The divider bar element 13 may also be referred to as insertion bar. FIGS. 3A and 3B show the divider bar element 13 being partially pulled out of the profile section 11 according to FIGS. 2A and 2B in different perspective views.

The divider bar module 10 or the divider bar 7 comprises a profile element 11 or profile section 11 and the actual removable or replaceable divider bar element 13, wherein divider fingers 14 are attached to the divider bar element 13. The profile member 11 is fastened within the handling apparatus 1 via fastening means 12 and attaching means 18 (see FIGS. 2A, 2B, 3A, and 3B); the profile element 11 is guided in particular circulating within the handling apparatus 1.

The divider bar element 13 and the profile section 11 or profile element 11 are at least largely form-lockingly and releasably coupled to each other. In particular, the profile element 11 comprises at least one receiving means 15, into which the divider bar element 13 can be at least partially inserted. In particular, the receiving means 15 is limited by two lateral sections 16. In particular, the profile element 11 and the divider bar element 13 each have a longitudinal axis L11, L13, whereby the two longitudinal axes L11 and L13 are aligned in parallel or coaxially to one another. The lateral sections 16 also extend parallel to the longitudinal axis L11 of the profile element 11. In particular, the divider bar element 13 can be inserted axially into the receiving means 15 between the two lateral sections 16 of the profile element 11. At the free ends of the divider bar element 13 respective positioning units and/or locking units 17 are arranged, which can fix the divider bar element 13 securely to the profile element 11, for example by means of a quick release system (not shown).

The positioning units and/or locking units 17 can be configured in such a way that the positioning units and/or locking units 17 can only be locked by a quick release system (not shown) when the divider bar element 13 is positioned correctly at the profile element 11. Thereby wrong installation positions can be prevented effectively.

In the illustrated embodiment the divider fingers 14 are releasable mounted to the divider bar element 13. In particular, the divider bar element 13 has a continuous groove 19 with an undercut 20 along its longitudinal axis L13, into which groove 19 fastening means 21, in particular screwing means 22 or the like, can engage in order to fix the divider fingers 14 to the divider bar element 13.

The divider fingers 14 are arranged perpendicular to the longitudinal axis L11 of the profile element 11 and in particular the divider fingers 14 are arranged in alignment with one another, especially all divider fingers 14 are arranged along a mutual line.

Figure 4A:
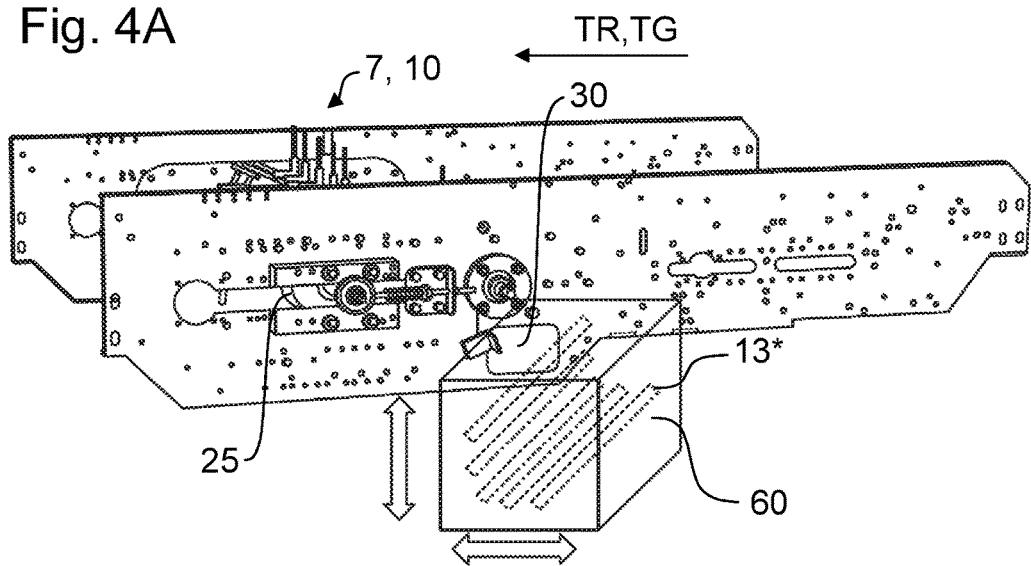
FIG. 4A shows the arrangement of a divider bar module according to the invention within a handling apparatus.
Figure 4B:
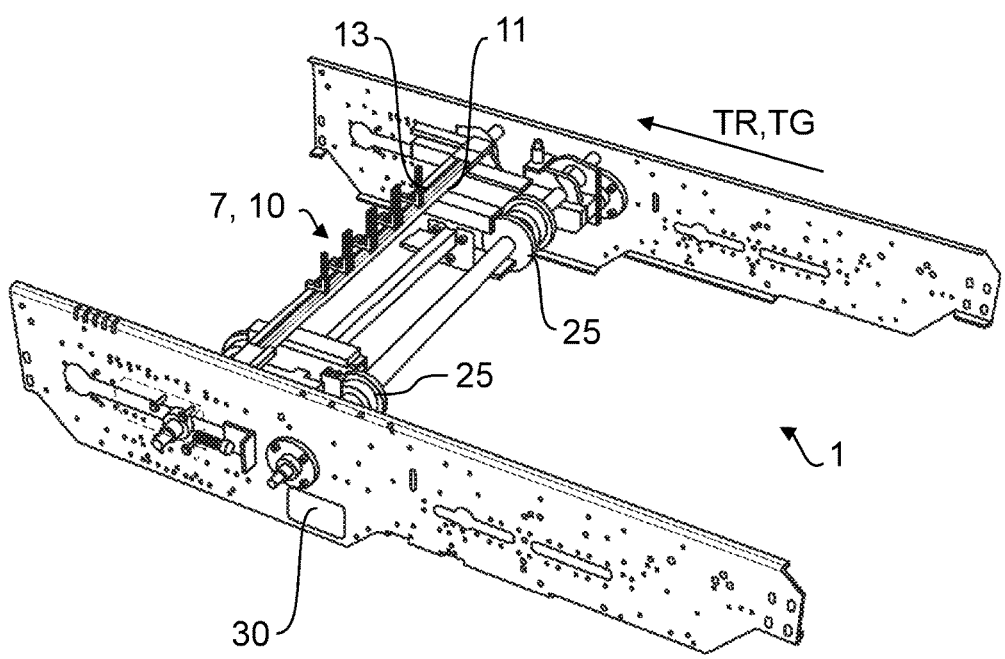
FIG. 4B shows another perspective view of the arrangement of the divider bar module within the inventive handling apparatus according to FIG. 4A.
Figure 4C:
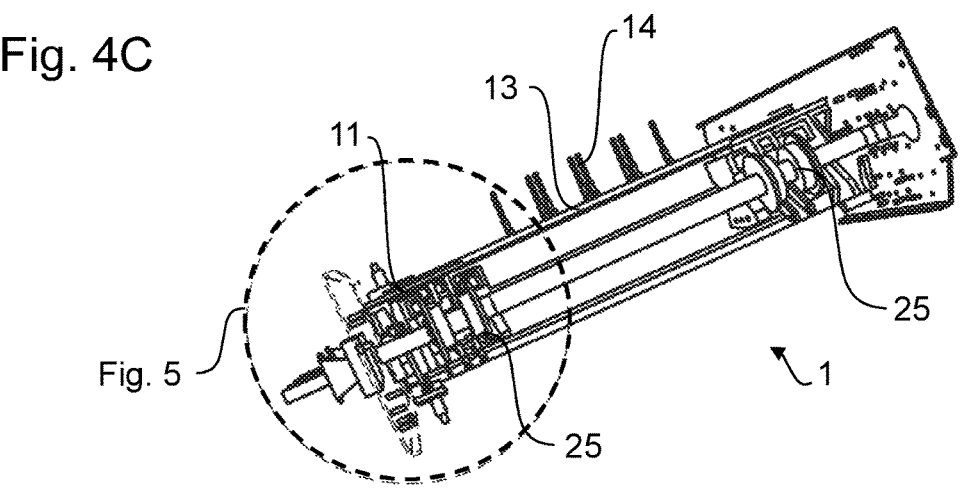
FIG. 4C shows a third perspective view of the arrangement of the divider bar module within the inventive handling apparatus according to FIGS. 4A and 4B.
Figure 5:
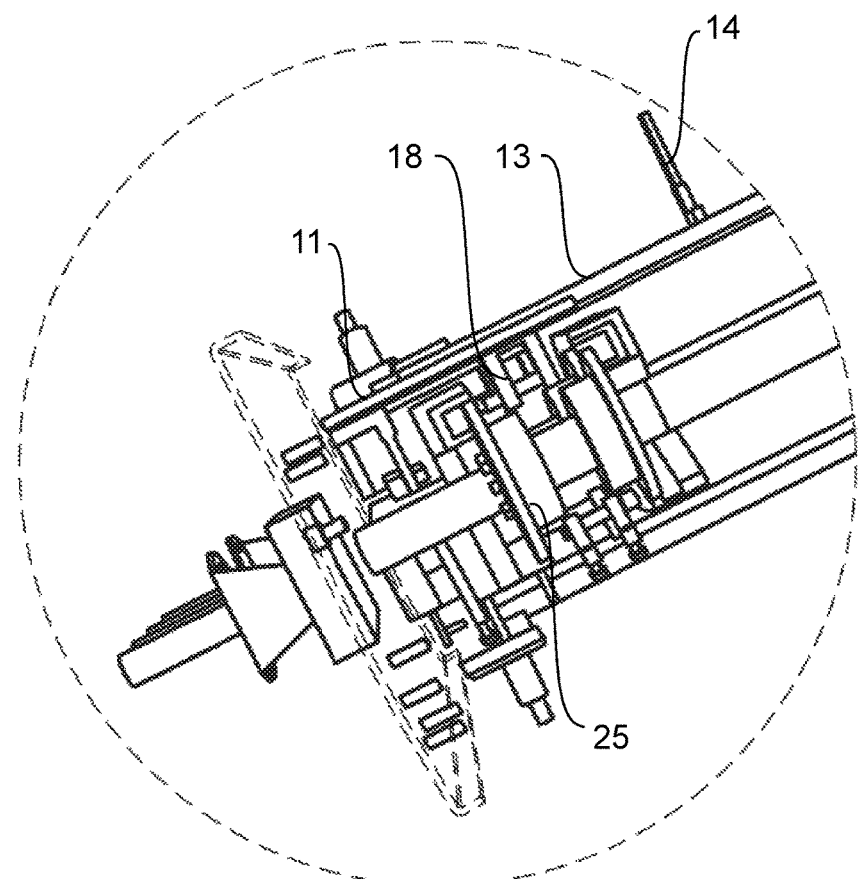
FIG. 5 shows an enlarged partial section of FIG. 4C.

FIGS. 4A to 4C show various perspective views of the arrangement of the divider bar module 10 according to the invention within a handling apparatus 1, while FIG. 5 shows a detailed view of a section of FIG. 4C.

The profile element 11 or profile section 11 of the divider bar module 10 is permanently mounted within the handling apparatus 1 via fastening means 12 (not visible) and attaching means 18 (not visible). In particular, the profile element 11 is assigned to and fixed to a circumferential chain of an endless conveyor means (not shown) via attaching means 18 so that the profile element 11 is movable within the handling apparatus 1 on a guided orbit or movement path. In FIGS. 4A to 5 deflection rollers 25 can be seen, whereby the endless conveyor means is guided over these deflection rollers 25. In particular, within each section of the free ends of the profile element 11 an attachment to an endless conveyor means is provided, in order to guide the movement of the profile element 11 within the handling apparatus 1 adequately and safely. Preferably, the two endless conveyor means are both coupled to a common drive so that both endless conveyor means are driven synchronously. However, it is also conceivable to provide two drives, which are driven synchronously. Alternatively it can be provided that the profile element 11 is attached to an endless conveyor means, the endless conveyor means having a width perpendicular to the transport direction TR that corresponds approximately to the length of the profile element 11.

The divider bar element 13 of the divider bar module 10 is easily releasable from the profile element 11 so that it can be replaced quickly and easily for a product change. In particular, a special changing position is provided for the exchange at the handling apparatus 1. At the changing position the handling apparatus 1 possesses a service opening 30. The divider bar element 13 of the at least one divider bar module 10 can be easily replaced through this service opening 30, whereby the mechanical coupling between the profile element 11 and the divider bar element 13 of the divider bar module 10 is released. For the replacement of the divider bar element 13, the divider bar module 10 is moved to the changing position, so that the divider bar module 10 together with the divider bar element 13 is located within the area of the service opening 30.

In this position a locking means can be released and the divider bar element 13 can be laterally pulled out of the profile element 11 through the service opening 30. Preferably a locking of the replaceable element 43 on the profile element 41 is provided only on one side of the handling apparatus 1 (see FIG. 6). The replaceable element 43 of the divider bar module 10, 40 is unilaterally releasable from the profile element 41 in the area of service opening 30 and can be removed easily from the handling apparatus 1 through the service opening 30. Following this, a new divider bar element 13 is inserted into the profile element 11 within the handling apparatus 1 in accordance with the requirements of the piece goods to be processed subsequently.

All steps that are necessary for the replacement of the divider bar element 13 can be performed unilaterally on or through the service opening 30 of the handling apparatus 1. Thus, it is no longer necessary that the operator must walk around the handling apparatus 1 in order to release another locking means or attaching means at the opposite end of the divider bar module 10.

When the phrase unilateral release or unilateral withdrawal is used, it is to be understood that an operator or a robot in an automated process does not need to act on the opposite side of the handling apparatus 1 in order to release and remove each respective replaceable element 43.

Figure 6:
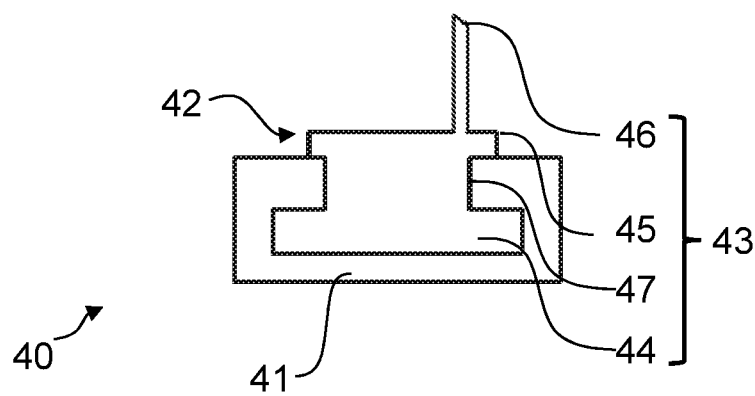
FIG. 6 shows a cross section through a second embodiment of a divider bar module according to the invention.

Thus, according to the shown embodiment, the handling apparatus 1 provides at least one access area, which allows the manual handling of the at least one divider bar element 13, 43; especially the tool less release of the at least one divider bar element 13, 43 from the profile section 11, 41 and/or a removal or an exchange against a further divider bar element 13, 43 (see FIGS. 2A to 3B, see FIG. 6 for design). As already mentioned, the at least one access area may be formed by a service opening 30 or the at least one access area may be equipped with a service opening 30, so that the divider bar element 13, 43 can be removed unilaterally from the divider bar module 10, 40 via the access area or via the service opening 30 after the separation of the divider bar element 13, 43 from the profile section 11, 41. The handling apparatus 1 may optionally include at least one changing position for the at least one divider bar module 10, 40; at which changing position the replacement of the divider bar element 13, 43 can be undertaken by separating the divider bar element 13, 43 from the profile section 11, 41. The changing position corresponds especially with the access area or with the service opening 30 and/or the changing position may be associated with the access area or with the service opening 30.

As already mentioned, the end of the profile section 11, 41 facing the service opening 30 and the end of the divider bar element 13, 43 facing the service opening 30 may be connected detachably to one another via one or more fastening means. It is particularly preferable that the one or more fastening means are easily accessible via the service opening 30.

In order to quickly and easily adapt the replaceable element 43 of the divider bar module 10, 40 to a new product format, a so-called changing mode is provided, in which changing mode the divider bar module 10, 40 is located in a changing position within the handling apparatus 1. In particular, the changing position is assigned to the service opening 30, so that the exchange can take place through the service opening 30. During the changing mode it is particularly preferred that the divider bar module 10, 40 is arranged in the changing position and the service opening 30 is located in alignment with the longitudinal axis of the divider bar module 10, 40.

After the at least one fastening means 21 is detached from the end of the divider bar module 10 (see FIG. 2A, FIG. 2B and FIG. 3A) facing the service opening 30 (see FIG. 4A, FIG. 4B), the replaceable divider bar element 13, 43 of the divider bar module 10, 40 can now be removed unilaterally via the service opening 30 or via the access area. In particular, the replaceable divider bar element 13, 43 is removed from or pulled out of the profile element 11, 41 or profile section 11, 41 through the service opening 30 (see FIGS. 2A to 3B, FIG. 6). Subsequently another replaceable divider bar element 13, 43 is inserted or pushed into the profile element 11, 41 via the service opening 30, the new replaceable divider bar element 13, 43 showing an arrangement of the divider fingers 6, 14 adapted for the new product. After the replaceable divider bar element 13, 43 is fixed to the profile element 11, 41 in the area of the service opening 30 via the at least one fastening means 21, the new production can be started.

In FIG. 4A a magazine 60 for multiple divider bar elements 13 is shown, the magazine 60 being arranged in the area of the service opening 30. For example, the magazine 60 can be designed movable horizontally and/or vertically. The movement of the magazine 60 may provide that the service opening 30 is not covered by the magazine 60 during an ongoing production process. Instead the magazine 60 is arranged directly at the service opening 30 during changing mode.

During a format change due to a product change the removal of the divider bar elements 13 from the handling apparatus 1, the removal of the divider bar elements 13\* from the magazine 60 and the replacement of the divider bar elements 13, 13\* at the profile elements 11 of the divider bar module 10 of the handling apparatus 1 can be done, in particular, through the service opening 30 and can be automated by a robot, a circular magazine, a paternoster magazine or the like.

While FIGS. 4A and 4B only show one divider bar element 13, in practice the handling apparatus 1 comprises a plurality of divider bars 7, which are respectively disposed spaced apart from each other on a defined movement path for the divider bars 7 (see FIGS. 1A and 1B). For replacement of the divider bar element 13 the divider bars 7 or divider bar modules 10 are successively placed in the changing position and the replaceable divider bar element 13, 43 is replaced in each case accordingly. Sensibly, the exchange is done sequentially, with all operational steps being carried out within the area of the service opening 30 or through the service opening 30. In addition, the divider bar element 13 of the divider bar modules 10 each have longitudinal axes L13 that extend below the transport plane for the piece goods 2, and transverse to the transport direction TR of the piece goods 2. If the divider bar 7 or divider bar module 10 in each case is located in the changing position, the service opening 30 is preferably in alignment with the longitudinal axis L13 of the divider bar element 13.

FIG. 6 shows a cross section through a second embodiment of a divider bar module 40 according to the invention; the divider bar module 40 comprising a divider finger 46. The divider bar module 40 comprises a profile element 41 with a C-shaped cross-section and a continuous longitudinal opening 42 parallel to the longitudinal axis of the profile element 41.

Furthermore, the divider bar module 40 includes a divider bar element 43 with an interior 44, the divider bar element 43 being releasable from the profile element 41. The interior 44 of the divider bar element 43 has an outer profile that at least partially mimics the inner profile of the profile element 41. Therefore the divider bar element 43 can be laterally inserted into a receptacle formed by the inner profile of the profile element 41.

The replaceable divider bar element 43 comprises a further exterior 45, after insertion of the divider bar element 43 into the profile element 41 this exterior 45 projects out of the longitudinal opening 42 of the profile element 41.

A transfer area 47 is arranged between the interior 44 and the exterior 45. The transfer area 47 is in particular a section of the divider bar element 43 extending through the longitudinal opening 42 of the profile element 41 in the mounted state of the divider bar module 40; that is, the state in which the divider bar element 43 is arranged within the profile element 41; in particular, the state in which the divider bar element 43 is inserted into the receptacle of the profile element 41.

The at least one divider finger 46 is arranged on the exterior 45 of the replaceable divider bar element 43 and sticks out at least substantially perpendicular to the longitudinal axes of the profile element 41 and the divider bar element 43. The divider finger 46 may be releasably or non releasably attached to the divider bar element 43.

As illustrated in FIG. 6, the divider bar elements 43 can be released out of the form-locking and/or force-locking contact with the profile section 41 and separated from the profile section 41 under cancellation of the form lock and/or force lock by relative movements between the divider bar element 43 and the profile section 41. According to the shown embodiment it can be provided that the respective divider bar element 43 is releasable out of the form-locking and/or force-locking contact and separable from the respective profile section 41 by moving the divider bar element 43 along its longitudinal extension direction. Alternatively it can be provided that the respective divider bar element 43 is releasable out of a form-locking and/or force-locking magnetic adhesive contact and separable from a the profile section 41 by twisting and/or lifting of the divider bar element 43 from the profile section 41. Moreover, according to a further alternative or additional embodiment it can be provided that each divider bar element 43 in its operating position is locked magnetically to the at least one profile section 41 and/or that each divider bar element 43 in its operating position is mechanically connected to the at least one profile section 41 for fixing the divider bar element 43 to the at least one profile section 41 in a defined installation position.

All these variations allow a fast, simple and largely tool less replacement of the divider bar elements 43 at the inventive handling apparatus 1 (FIG. 1A, FIG. 1B). Thereby product changes can be done much faster compared to previously known devices.

Figure 7:
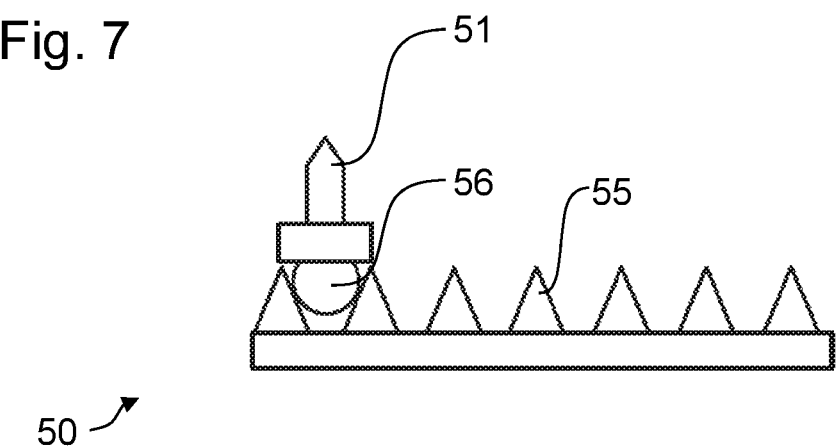
FIG. 7 shows a further embodiment of a replaceable divider bar element of a divider bar module according to the invention.

FIG. 7 shows a further embodiment of an exchangeable or replaceable divider bar element 50 of a divider bar module according to the invention. In this embodiment, the divider fingers 51 are secured to the divider bar element 50 in such a way that they can be removed without tools. The divider fingers 51 can be arranged variably within a predetermined interlock pattern on the divider bar element 50. For this purpose, the divider bar element 50 comprises interlocking devices 55 and the divider fingers 51 comprise corresponding interlocking means 56. A particular tool-free releasable locking connection can be established between the interlocking device 55 of the divider bar element 50 and the interlocking means 56 of the divider fingers 51, thus allowing the use of the divider bar element 50 for multiple product formats.

The setting of the divider fingers 51 on the exchangeable divider bar elements 50 could, for example, be done time parallel to an adjustment of the transport lanes for the articles or piece goods 2. In particular, a mechanical coupling between the lane guides separating the article lanes and/or the transport lanes for the articles or piece goods 2 and the divider fingers 51 may be provided. In particular, it may be provided that the divider fingers 51 are taken along with the associated transport belts during an adjustment of the lane guides and/or during the adjustment of transport lanes for the articles or piece goods 2, in particular conveyor belts or the like. In particular it may be provided that the divider fingers 51 are carried along when the lane guides or transport lanes are adjusted in the horizontal direction perpendicular to the transport direction TR.

The handling apparatus 1 may include a control unit (not shown here), which drives the movements of the divider bars 7 or divider bar modules 10. In particular, the path of movement of each divider bar 7 or divider bar module 10 can be controlled by the control unit, in order to bring the divider bar 7 or divider bar module 10 into the changing position adjacent to the service opening 30 or adjacent to the access area in a controlled manner. The control unit may, for example, be the overall control of the handling apparatus 1. The control unit may, in particular, control the production process of the handling apparatus 1. Furthermore, the divider bar 7 or divider bar module 10 can be driven into the changing position controlled by the control unit, so that the exchange of the replaceable divider bar element 13, 43 can take place.

Since the handling apparatus 1 comprises a plurality of divider bars 7 or divider bar modules 10, whose replaceable divider bar elements 13, 43 have to be replaced, for example during a product change, it is sensible to place each divider bar 7 or divider bar module 10 successively in the changing position. If a replacement is performed by an operator, different security mechanisms can be provided to ensure that a divider bar 7 or divider bar module 10 can only be moved out of the changing position after the exchange is completed. Thus, for example, it may be provided, that the operator has to acknowledge certain operations to a control unit before the divider bar 7 or divider bar module 10 can be moved along its path of movement out of the changing position and the next divider bar 7 or divider bar module 10 can enter the changing position.

The operator may only receive the enabling condition for the next divider bar module 10 when certain conditions are met. For this purpose at least one detection device may be provided, in particular a sensor. The sensor may check an occupancy of the profile elements 11, 41. For example, a limit switch may be carried along with each profile element 11, 41, which transmits a signal to a control unit if a replaceable divider bar element 13, 43 is present. In particular, a YES/NO mechanism can be provided for this particular purpose. A YES signal indicates that a replaceable divider bar element 13, 43 is positioned correctly at the profile element 11, 41 or that a replaceable divider bar element 13, 43 is positioned correctly at a receiving element. A NO signal is generated as long as no replaceable divider bar element 13, 43 is arranged at the profiled element 11, 41 or at the receiving element. Furthermore a NO signal is generated when the replaceable divider bar element 13, 43 is not positioned correctly, for example, because it has not yet inserted completely into the profile element 41.

To additionally ensure that the correct replaceable divider bar element 13, 43 was installed, this can be monitored, for example, by a camera coupled to the control unit. Alternatively, a RFID reader coupled to the control unit may be used, which is arranged in the vicinity of the handling apparatus 1 and in particular in the vicinity of the changing position and with which RFID tags arranged on the divider bar elements 13, 43 can be read.

Optionally, it may be provided that the profile elements 11, 41 or profile sections including the replaceable divider bar elements 13, 43 with the divider fingers 6, 14 can be lowered into a changing position or service position. Thus, for example, it may be provided, that the conveyor means, which sets the path of movement of the divider bar 7 or divider bar module 10, can be lowered into the changing position or service position relative to the transport plane 5 of the articles 2. In this way, the replaceable divider bar elements 13, 43 of the divider bars 7 or divider bar modules 10 can be laterally pulled out of the profile elements 11, 41 or profile sections 11, 41 or receiving elements transversely to the transport direction TR without a collision of the divider fingers 6, 14 with the transport device 4 or the transport plane 5 for the articles or piece goods 2, between which at least temporarily at least a part of divider fingers 6, 14 are arranged in the operating mode.

Alternatively, a distance between two divider bars 7 or divider bar modules 10 can be adjusted in such a way that in the event of a format change all removable divider bars 7 or divider bar modules 10 can be positioned below the transport plane 5 at the same time. In this case it is ensured that no divider fingers 6, 14 protrude above the transport plane 5 through the transport device 4 for the articles or piece goods 2.

In particular, when the handling apparatus 1 comprises a plurality of divider bars 7 or divider bar modules 10, it may be provided, that the control unit controls the sequential placement of the divider bars 7 or divider bar modules 10 within the changing position. An additional control mechanism or a contact switch or the like may be provided, which is activated after the correct fixation or fastening of the interchangeable divider bar element 13, 43 to the profile element 11, 41 or profile section 11. Only after the contact switch or the like gives a respective signal that the replaceable divider bar element 13, 43 is positioned correctly on the profile element 11, 41 or the profile section 11, the adjustable divider bar 7 or divider bar module 10 that is arranged in the changing position can be moved out of this changing position and the subsequent divider bar 7 or divider bar module 10 can now be positioned within the changing position. Further control mechanisms known to the expert can also be used advantageously.

A grouping device or a handling apparatus 1 according to the invention thus includes in particular a profile element 11, 41, which is permanently arranged and fixed within the handling apparatus 1. The grouping device or a handling apparatus 1 furthermore comprises a replaceable divider bar element 13, 43, which is adapted according to the requirements, in particular according to the requirements of the processed products or piece goods 2. The replaceable divider bar element 13, 43 of the divider bar 7 or divider bar module 10 is easily detachable from the profile element 11, 41. This is preferentially done without the use of tools. The replaceable divider bar element 13, 43 of the divider bar 7 or divider bar module 10 can be replaced quickly and easily during a product change on one side of the handling apparatus 1. Since the fastening means 21 between the profile element 11, 41 and the replaceable divider bar element 13, 43 is releasable from just one side of the handling apparatus 1, the exchange is greatly simplified, because the operator is not required to additionally release a second fastening means of the divider bar 7 or divider bar module 10 on the other side of the handling apparatus 1. As described further below, it is additionally possible to automate the release and replacement of the replaceable divider bar element 13, 43 of the divider bar 7 or divider bar module 10 with the at least one divider finger 6, 14.

The profile section 11, 41 and the replaceable divider bar element 13, 43 each have a longitudinal axis. In particular, the longitudinal axes of the removable divider bar element 13, 43 and the profile section 11, 41 in their installed state, that is, when the removable divider bar element 13, 43 is operatively connected to the profile element 11, 41 or profile section 11, 41, are arranged in parallel or coaxially aligned with each other.

As can be seen FIGS. 2A to 3B and FIG. 6, the profile element 11, 41 or the profile section 11, 41 have a receiving means 15 for the replaceable divider bar element 13, 43 of the divider bar 7 or divider bar module 10, the receiving means 15 running parallel or coaxially to the longitudinal axis of the profile element 11, 41 or profile section 11, 41. Preferably it may be provided, that at least one of the lateral sections 16 of the profile element 11, 41 or profile section 11, 41 perpendicular to the longitudinal axis of the profile element 11, 41 or profile section 11, 41 comprises a receiving opening 15 for the removable divider bar element 13, 43. The interchangeable divider bar element 13, 43 can be inserted or pushed into the receiving means 15 of the profile element 11, 41 in an axial direction through this receiving opening 15. In this way, the replaceable divider bar element 13, 43 can thus be replaced quickly and easily on the profile element 11, 41. Optionally, interlocking connections, magnetic connection or the like may support this positioning or define the exact positioning.

Optionally, the profile element 11, 41 is a hollow tube made of a metal such as aluminum or any other suitable material, which has a continuous longitudinal opening 42 over its entire length parallel to its longitudinal axis L11 (see FIGS. 6, 3B). The replaceable divider bar element 13, 43 may, for example, be formed by a solid profile or a hollow profile. The outer periphery of the replaceable divider bar element 13, 43 is at least slightly smaller than the inner periphery of the profile element 11, 41, so that the divider bar element 13, 43 can be pushed into the profile element 11, 41 vertically to the longitudinal axis of the profile element 11, 41 via the open side surfaces with play between the divider bar element 13, 43 and the profile element 11, 41. The divider fingers 6, 14, 46 are arranged on the replaceable divider bar element 13, 43 in a line parallel to the longitudinal axis L13 of the divider bar element 13, 43 (see FIG. 3B) and have, for example, a third width which is smaller than a first width of the continuous longitudinal opening 42 of the profile element 11, 41. The removable divider bar element 13, 43 is inserted into the profile element 11, 41 or in the profile section in such a manner, that the divider fingers 6, 14, 46 protrude outwardly through the continuous longitudinal opening 42 of the profile element 11, 41 (FIG. 6).

According to the embodiments shown in FIG. 6 as well as in FIG. 2A and FIG. 2B and/or in FIG. 3A and FIG. 3B it may be provided, that the profile section 11, 41 is formed by a profile tube or a mounting bar with a longitudinal axis L11, the profile tube or mounting bar having a C-shaped cross-section. The profile tube 11, 41 or mounting bar has a continuous longitudinal opening 42 parallel to the longitudinal axis L11; the longitudinal opening 42 having a smaller width than the height of the side of the profile tube 11, 41 within which the longitudinal opening 42 is formed. The profile tube 11, 41 or the mounting bar comprises, for example, an integrated groove 19 parallel to the longitudinal axis L11 of the profile tube 11, 41 or mounting bar (see FIG. 2A and FIG. 2B). The groove 19 may further comprise an undercut 20. Preferably, the removable divider bar element 13, 43 has an outer profile that at least partially mimics the inner profile of the profile element 11, 41. Preferentially a certain play exists between the outer profile of the replaceable divider bar element 13, 43 or replaceable element and the inner profile of the profile element 11, 41. This play is important in order to quickly and easily slide in the replaceable element or the replaceable divider bar element 13, 43 into the profile element 11, 41.

The at least one divider finger 6, 14, 46 is arranged on the replaceable divider bar element 13, 43 in such a way that it protrudes outwardly through the longitudinal opening 19, 42 of the profile element 11, 41 or profile section 11, 41. According to this embodiment the at least one divider finger 6, 14, 46 arranged on the replaceable divider bar element 13, 43 has a third width, which is smaller than a first width of the continuous longitudinal opening 19, 42 of the receiving means 15 of the profile element 11, 41.

Alternatively, the replaceable divider bar element 13, 43 is formed in such a way that it comprises a first insertion area or interior 44, which is formed corresponding to the inner profile of the profile element 11, 41 and which can be pushed laterally into the profile element 11, 41. The divider fingers 6, 14, 46 are arranged on a further exterior 45 of the removable divider bar element 13, 43 and can optionally have a third width that may be larger than a first width of the continuous longitudinal opening 42 of the receiving means (see FIG. 6).

The replaceable divider bar element 13, 43 may have a second width, which is greater than a first width of the continuous longitudinal opening 42 of the receiving means 15. For example, the insertion area comprises at least a second width which is bigger than a first width of the continuous longitudinal opening 42 of the profile element 11, 41. This ensures that the insertion region of the exchangeable divider bar element 13, 43 remains inside the profile element 11, 41 and cannot fall out through the longitudinal opening 42. Furthermore, the removable divider bar element 13, 43 has a narrow transition region with a width that is smaller than the first width of the continuous longitudinal opening 42 of the profile element 11, 41. In addition, the replaceable divider bar element 13, 43 comprises at least one so-called exterior 45, which is located on the outside of the profile element 11, 41 when the divider bar element 13, 43 is mounted to the profile element 11, 41. This exterior 45 preferably also has a width that is bigger than the first width of the continuous longitudinal opening 42 of the profile element 11, 41. In this embodiment the divider fingers 6, 14, 46 are preferentially arranged on the exterior 45. In particular releasably mounted divider fingers 6, 14, 46 may be arranged on such a replaceable divider bar element 13, 43, which divider fingers 6, 14, 46 can be rearranged in different positions on the removable divider bar element 13, 43 depending on the requirements of piece goods 2 to be grouped or separated.

The at least one divider finger 6, 14, 46 is arranged substantially perpendicular to the longitudinal axis L11 of the profile element 11, 41 and the replaceable divider bar element 13, 43 and/or substantially perpendicular to the continuous longitudinal opening 42 of the profile element 11, 41 or profile section 11, 41.

In order to fulfill their purpose in the desired manner, the divider fingers 6, 14, 46 are firm in all directions. The divider fingers 6, 14, 46 on the divider bar elements 13 that have been exchanged against previously withdrawn divider bar elements 13 are preferably designed in such a way that they have the maximum impact force only in direction of transfer of the product or piece goods 2. A lateral force can be virtually excluded due to the defined transport direction of the product or piece goods 2. For this purpose the divider fingers 6, 14, 46 are, in particular, laterally mounted via sliding blocks within a groove of the replaceable divider bar element 13, 43. Hereby a form-locking connection between the divider fingers 6, 14, 46 and the removable divider bar element 13, 43 is given in the transport direction TR of articles or piece goods 2 by the groove 19 itself. Transverse to the transport direction TR of the articles or piece goods 2 the form-lock is achieved by the clampable sliding block. Alternatively or additionally, the divider finger 6, 14, 46 may at least partially show a profile when seen in cross-section (cut horizontally through a vertically inclined divider finger) which is non-circular and wherein more material is provided along an axis in the transport direction TR, in particular wherein more material is provided transversely to transport direction TR.

As has already been described with reference to FIGS. 2A to 3B, at the end of the divider bar element 13, 43 adjacent to the service opening 30 at least one fastening means 21, 22 is provided, which must be released in order to separate the replaceable divider bar element 13, 43 from the profile element 11, 41; in particular in order to pull out the replaceable divider bar element 13, 43 from the profile element 11, 41 parallel to the longitudinal axis L13 of the divider bar element 13.

The fastening means 21, 22 are used for stationary fixing of the replaceable divider bar element 13, 43 to the profile element 11, 41 during the ongoing production process. Thus, the fastening means 21, 22 prevent a lateral movement of the removable divider bar element 13, 43 during the ongoing production process, in particular the fastening means 21, 22 prevent a relative movement between the removable divider bar element 13, 43 and the profile element 11, 41; in particular the fastening means 21, 22 prevent a movement which is coaxial with or parallel to the longitudinal axes L13, L11 of the divider bar element 13, 43 and the profile element 11, 41. In addition, the fastening means 21, 22 define the position of the removable divider bar element 13, 43 and thus the position of the at least one divider finger 6, 14, 46 at the profile element 11, 41.

As fastening means 21, 22 preferably means for tool-free locking are used, in particular screw connections or quick release systems. Particularly preferably, quick release systems can be operated with one hand. The locking mechanism may work mechanically, electro-mechanically, electrically, pneumatically, hydraulically or the locking mechanism may be operated by software. It is also possible to cause a controlled electric locking of a bolt via the control unit of the handling apparatus 1. Or a simple mechanical locking in the form of a bar or the like is used, which prevents lateral movement of the replaceable divider bar element 13, 43 and which can be released or fixed preferably in an easy, fast and/or tool-free manner by the operator. Also magnetic connections or mechanically interlocking connections, possibly electromagnetically unlatching or releasing connections, can be used for the positioning and fixing of the divider bar elements 13, 43 to the profile sections 11, 41.

As already described above, a control mechanism may be coupled to ensure the correct fastening of the divider bar element 13, 43 with the fastening means 21, 22; which control mechanism prevents the divider bar element 13, 43 from leaving the changing position as long as the divider bar element 13, 43 is not positioned correctly at the profile element 11, 41. As a result, incorrect installation positions can be prevented effectively.

It is preferably provided that the profile element 11, 41 comprises a closed side surface at the opposite end of the divider bar 7 or divider bar module 10, so that the insertion of the removable divider bar element 13, 43 into the profile element 11, 41 is spatially limited by the closed side surface. In this context, an interlocking or interlatching mechanism may be alternatively provided at the end section opposite to the fastening means 21, 22, which fixes the end section of the replaceable divider bar element 13, 43 easily releasable to the end section of the profile element 11, 41. This could be achieved, for example, through a kind of forced guidance of the replaceable divider bar element 13, 43 within the profile element 11, 41. This easily releasable fixing or forced guidance needs to be easily releasable under tension and needs to come off autonomously while withdrawing the replaceable divider bar element 13, 43 from the profile element 11, 41 through the service opening 30.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

1 Handling apparatus,
2 Piece goods
2a Stream of piece goods/piece good stream
2b, 2c Group of piece goods/grouped piece goods
2d Group of piece goods
2L Last piece goods in a group of piece goods
2V Preceding piece good
3 Beverage container
4 Transport device, transport section
5 Transport plane
6 Divider finger
6a, 6b Divider finger
7 Divider bar
7a, 7b Divider bar
8 Cantilever arm
9 X-Y table
10 Divider bar module
11 Profile element, profile section, profile tube
12 Fastening means
13, 13* Divider bar element
14 Divider finger
15 Receiving means/receiving opening
16 Lateral section
17 Positioning units and/or locking units
18 Attaching means
19 Groove
20 Undercut
21 Fastening means
22 Screwing means
25 Deflection rollers
30 Service opening
40 Divider bar module
41 Profile element, profile section, profile tube
42 Longitudinal opening
43 Divider bar element
44 Interior
45 Exterior
46 Divider finger
47 Transfer area
50 Divider bar element
51 Divider finger
55 Interlocking device
56 Interlocking means
60 Magazine
L Longitudinal axis, longitudinal extension direction
TG Transport speed
TR Transport direction

I claim:

1. An apparatus (1) for grouping piece goods (2) comprising:
at least one divider finger (14, 46, 51) being introduced transversely to a transport plane (5) from below into a substantially continuous stream (2a) of piece goods (2) which are being fed on a transport section (4) along the transport plane (5) and which are grouped along a transport direction (TR),
wherein the at least one divider finger (14, 46, 51) is connected to a divider bar element (13, 13*, 43, 50) extending transversely to the transport direction (TR) and below the transport plane (5),
wherein the divider bar element (13, 13*, 43, 50) is anchored on both sides of the transport plane (5) at one or more conveying devices and is form-lockingly and/or force-lockingly fixed to at least one profile section (11, 41),
wherein the fixing of the divider bar element (13, 13*, 43, 50) to the at least one profile section (11, 41) is toollessly detachable and reproducibly mountable in a specified installation position,
at least one access area or service opening (30), where the divider bar element (13, 13*, 43, 50) may be removed or inserted, and
at least one magazine (60), comprising a plurality of different divider bar elements (13, 13*, 43, 50),
wherein the at least one magazine is located in the vicinity of the at least one access area or service opening (30).

2. The apparatus of claim 1 wherein the at least one profile section (11, 41) is guided movably in a specified movement path below the transport plane (5) together with the divider bar element (13, 13*, 43, 50), wherein the divider bar element (13, 13*, 43, 50) is at least in sections fixable to the at least one profile section (11, 41) in a form-locking and/or force-locking contact.

3. The apparatus of claim 2 wherein the divider bar element (13, 13*, 43, 50) is releasable out of the form-locking and/or force-locking contact to, and is separable from, the at least one profile section (11, 41) by moving the divider bar element (13, 13*, 43, 50) relative to the profile section (11, 41).

4. The apparatus of claim 3 wherein the divider bar element (13, 13*, 43, 50) is releasable out of the form-locking and/or force-locking contact to, and is separable from, the at least one profile section (11, 41) by shifting the divider bar element (13, 13*, 43, 50) along its longitudinal extension direction (L).

5. The apparatus of claim 3 wherein the divider bar element (13, 13*, 43, 50) is releasable out of the form-locking and/or force-locking contact to, and is separable from, the at least one profile section (11, 41) by twisting and/or lifting off the divider bar element (13, 13*, 43, 50).

6. The apparatus of claim 5 wherein the divider bar element (13, 13*, 43, 50), in its operating position, is magnetically and/or mechanically interlocked with the at least one profile section (11, 41).

7. The apparatus of claim 1 further comprising at least one access area for the purpose of manual handling, removing, or interchanging of the at least one divider bar element (13, 13*, 43, 50), which is toollessly detachable from the profile section (11, 41).

8. The apparatus of claim 7 wherein the at least one access area is formed by a service opening (30) or comprises a service opening (30).

9. The apparatus of claim 7 wherein the divider bar element (13, 13*, 43, 50) is removable on one side by way of the at least one access area after being separated from the at least one profile section (11, 41).

10. The apparatus of claim 7 wherein the at least one divider bar module (10, 40) has at least one change position, wherein, at the change position, an interchange of the divider bar element (13, 13*, 43, 50) is performable under separation from the profile section (11, 41), wherein the change position corresponds with and/or is assigned to the access area.

11. A method for format change within an apparatus (1) for grouping piece goods (2) comprising:
feeding the piece goods (2) on a transport section (4) along a transport plane (5) in a substantially continuous stream (2a)
grouping the piece goods (2) along a transport direction (TR) by at least one divider finger (14, 46, 51) being introduced transversely to the transport plane (5) from below into the stream (2a), wherein the at least one divider finger (14, 46, 51) is connected to a divider bar element (13, 13*, 43, 50) extending transversely to the transport direction (TR) and below the transport plane (5), wherein the divider bar element (13, 13*, 43, 50) is anchored on both sides of the transport plane (5) at one or more conveying devices and form-lockingly and/or force-lockingly fixed to at least one profile section (11, 41); and
toolessly detaching the divider bar element (13, 13*, 43, 50) from the at least one profile section (11, 41); and
interchanging the divider bar element (13, 13*, 43, 50) with a second divider bar element (13, 13*, 43, 50), wherein the second divider bar element (13, 13*, 43, 50) has divider fingers (14, 46, 51) that are positioned differently and/or spaced apart differently from divider fingers (14, 46, 51) of the divider bar element (13, 13*, 43, 50),
wherein the interchanging step comprises interchanging the divider bar element (13, 13*, 43, 50) with the second divider bar element (13, 13*, 43, 50) in at least one access area or through at least one service opening (30), and
wherein the second divider bar element (13, 13*, 43, 50) is selected from a magazine containing a plurality of divider bar elements (13, 13*, 43, 50).

12. The method of claim 11 wherein the toolessly detaching step further comprises separating the divider bar element (13, 13*, 43, 50) from the at least one profile section (11, 41) by moving the divider bar element (13, 13*, 43, 50) relative to the profile section (11, 41).

13. The method of claim 11 wherein the toolessly detaching step further comprises separating the divider bar element (13, 13*, 43, 50) from the at least one profile section (11, 41) by shifting the divider bar element (13, 13*, 43, 50) along its longitudinal extension direction (L).

14. The method of claim 11 wherein the toolessly detaching step further comprises separating the divider bar element (13, 13*, 43, 50) from the at least one profile section (11, 41) by twisting and/or lifting off the divider bar element (13, 13*, 43, 50).

15. The method of claim 14 wherein the divider bar element (13, 13*, 43, 50), in its operating position, is magnetically and/or mechanically interlocked with the at least one profile section (11, 41).

16. The method of claim 11 further comprising controlling the movements of the profile section (11, 41) and specified positioning of the profile section (11, 41) along its movement path with a control unit, and bringing the divider bar element (13, 13*, 43, 50) the change position adjacent to the access area or adjacent to the service opening (30).

17. The method of claim 11 wherein the interchange step is carried out in an automated fashion with the aid of a handling apparatus or with the aid of a robot.

18. The method of claim 11 further comprising reproducibly mounting the divider bar element (13, 13*, 43, 50) to the at least one profile section (11, 41) in a specified installation position.

19. An apparatus (1) for grouping piece goods (2) comprising:
at least one divider finger (14, 46) being introduced transversely to a transport plane (5) from below into a substantially continuous stream (2a) of piece goods (2) which are being fed on a transport section (4) along the transport plane (5) and which are grouped along a transport direction (TR),
wherein the at least one divider finger (14, 46) is connected to a divider bar (10, 40) extending transversely to the transport direction (TR) and below the transport plane (5),
wherein the divider bar (10, 40) is anchored on both sides of the transport plane (5) at one or more conveying devices;
wherein the divider bar (10, 40) is made of at least two parts and comprises at least one profile element (11, 41) and a replaceable divider bar element (13, 43), wherein the at least one divider finger (14, 46) is arranged on the replaceable divider bar element (13, 43);
wherein the replaceable divider bar element (13, 43) is form-lockingly and/or force-lockingly fixed to at least one continuous profile element (11, 41) or wherein the replaceable divider bar element (13, 43) is form-lockingly and/or force-lockingly fixed to the at least one profile elements (11, 41) holding at least end sections of the replaceable divider bar element (13, 43);
wherein the replaceable divider bar element (13, 43) is toolessly detachable and reproducibly mountable to the at least one profile element (11, 41) in a specified installation position;
wherein the replaceable divider bar element (13, 43) comprises a longitudinal axis (L), and
wherein the replaceable divider bar element (13, 43) is detachable from the at least one profile element (11, 41) by shifting it along the longitudinal axis (L).

* * * * *